United States Patent
Mito et al.

(10) Patent No.: US 7,492,650 B2
(45) Date of Patent: Feb. 17, 2009

(54) SEMICONDUCTOR STORAGE DEVICE HAVING A USER REGION AND A REDUNDANCY REGION

(75) Inventors: Kumiko Mito, Osaka (JP); Takashi Oshikiri, Osaka (JP)

(73) Assignee: MegaChips LSI Solutions Inc., Osaka-shi (JP)

( * ) Notice: Subject to any disclaimer, the term of this patent is extended or adjusted under 35 U.S.C. 154(b) by 0 days.

(21) Appl. No.: 11/613,548

(22) Filed: Dec. 20, 2006

(65) Prior Publication Data
US 2007/0171737 A1     Jul. 26, 2007

(30) Foreign Application Priority Data
Jan. 20, 2006   (JP) ............................. 2006-012211

(51) Int. Cl.
    *G11C 7/00* (2006.01)
(52) U.S. Cl. .............. 365/200; 365/230.03; 365/230.06
(58) Field of Classification Search .................. 365/200, 365/230.03, 230.06
    See application file for complete search history.

(56) References Cited
U.S. PATENT DOCUMENTS
3,633,175 A      1/1972   Harper
6,131,139 A  * 10/2000   Kikuchi et al. .............. 711/103
6,414,885 B2 *  7/2002   Nagamatsu et al. ......... 365/200
6,438,044 B2 *  8/2002   Fukuda ....................... 365/200
6,442,083 B2 *  8/2002   Hotaka ....................... 365/200

FOREIGN PATENT DOCUMENTS
EP        1 416 389 A2    5/2004
JP        8-235028        9/1996
WO        WO 86/04727     8/1986

* cited by examiner

*Primary Examiner*—Connie C Yoha
(74) *Attorney, Agent, or Firm*—Oblon, Spivak, McClelland, Maier & Neustadt, P.C.

(57) ABSTRACT

The present invention provides a semiconductor storage device that requires no specialized circuit or the like for reading redundancy data from a redundancy region, and that is capable of freely changing the arrangement of the redundancy region in the memory array area. A semiconductor storage device of the present invention includes a memory array configured as shown below. The memory array includes a user region which is composed of given page units and where user data is stored, and a redundancy region which is composed of the same given page units and where redundancy data is stored. The area in the memory array can be used either as the user region or as the redundancy region.

7 Claims, 6 Drawing Sheets

READ COMMAND

| I D | USER-DATA PAGE ADDRESS | REDUNDANCY ADDRESS |
|---|---|---|

FIG. 6

SEMICONDUCTOR STORAGE DEVICE HAVING A USER REGION AND A REDUNDANCY REGION

BACKGROUND OF THE INVENTION

1. Field of the Invention

The present invention relates to semiconductor storage devices, and particularly to a semiconductor storage device that has a user region and a redundancy region.

2. Description of the Background Art

In a semiconductor storage device having a nonvolatile memory (hereinafter referred to as a memory array) that contains faulty bits, the memory array includes a user region and a redundancy region. The user region is a region where user data is stored, and the redundancy region is a region where redundancy data is stored, such as error-correcting code, fault map, etc. For example, Japanese Patent Application Laid-Open No. 8-235028(1996) (hereinafter referred to as Patent Document 1) discloses a memory array configuration having a user region and a redundancy region.

In the memory array of Patent Document 1, each page includes a pair of a user region and a redundancy region. The redundancy region is provided as a region that is added to the user region. Each redundancy region functions for correction etc. of the user region that forms a pair with that redundancy region. The capacity of the redundancy region is much smaller than the capacity of the user region.

The memory array configuration of Patent Document 1 may require specialized circuitry for reading redundancy data from the redundancy regions. However, separately providing such specialized circuitry leads to increased manufacturing costs. It also requires extra tests for testing the specialized circuitry, which complicates the process of testing the semiconductor storage device.

Also, in the memory array configuration of Patent Document 1, the areas of the memory that are used as redundancy regions can function only to store redundancy data, and the areas of the memory that are used as user regions can function only to store user data.

That is, the memory areas serving as redundancy regions cannot be used as user regions, and the memory areas serving as user regions cannot be used as redundancy regions. It is therefore impossible to locate the redundancy regions in appropriate positions according to variations among individual memory arrays.

SUMMARY OF THE INVENTION

An object of the present invention is to provide a semiconductor storage device that requires no specialized circuit or the like for reading redundancy data from a redundancy region, and that is capable of freely changing the arrangement of the redundancy region in the memory array area.

According to a first aspect of the invention, a semiconductor storage device includes a memory array, and the memory array includes a user region where user data is stored, and a redundancy region where redundancy data is stored. The user region and the redundancy region are each composed of given page units, so that an area in the memory array can be used either as the user region or as the redundancy region.

Accordingly, it is not necessary to provide a specialized circuit for reading the redundancy data from the redundancy region. This reduces the manufacturing costs and eliminates the need for more complicated test process. Also, the configuration described above allows the position of the redundancy region to be freely changed in the memory array.

According to a second aspect of the invention, the semiconductor storage device of the first aspect includes an I/O portion and a controller. The I/O portion receives a read command from outside. The read command contains information about a user address indicating an address in the user region where a specified piece of the user data is stored, and information about a redundancy address indicating an address in the redundancy region where a piece of the redundancy data that corresponds to the specified piece of user data is stored. The controller reads the specified piece of user data from the user region on the basis of the information about the user address. Also, the controller reads the piece of redundancy data that corresponds to the specified piece of user data from the redundancy region on the basis of the information about the redundancy address.

Thus, it is possible to read specified user data and the corresponding redundancy data on the basis of the single read command, from the memory array having the configuration of the first aspect. That is, it is possible to enhance the speed of the operation of reading specified user data and the corresponding redundancy data.

According to a third aspect of the invention, in the semiconductor storage device of the second aspect, the information about the redundancy address is an address value or an index value used in relative addressing. The semiconductor storage device further includes a redundancy address offset register that is capable of setting an offset value. The controller reads the specified piece of redundancy data from the redundancy region on the basis of the address value or the index value and the offset value set in the redundancy address offset register.

Thus, it is possible to read specified redundancy data by relative addressing, from the memory array having the configuration of the first aspect.

According to a fourth aspect of the invention, in the semiconductor storage device of the third aspect, the redundancy address offset register is capable of setting the offset value through an operation of external equipment.

Thus, it is possible to freely change the starting address of the redundancy region through an operation of external equipment. That is, it is possible to freely change the position of the redundancy region in the memory array through an external operation.

According to a fifth aspect of the invention, in the semiconductor storage device of the second aspect, the information about the redundancy address indicates a variation from the previous address. The controller specifies the current address on the basis of the variation from the previous address. Then, the controller reads the piece of redundancy data that corresponds to the specified piece of user data from the redundancy region on the basis of the specified current address.

Thus, it is possible to read specified redundancy data on the basis of the amount of variation from the previous address, from the memory array having the configuration of the second aspect.

According to a sixth aspect of the invention, in the semiconductor storage device of the second aspect, the information about the redundancy address indicates a given expression for calculation. The controller specifies the address on the basis of the given expression for calculation. The controller then reads the piece of redundancy data that corresponds to the specified piece of user data from the redundancy region on the basis of the specified address.

Thus, it is possible to read specified redundancy data on the basis of the given expression for calculation, from the memory array having the configuration of the second aspect.

According to a seventh aspect of the invention, the semiconductor storage device of the first aspect further includes a redundancy data storing register capable of temporarily storing redundancy data read from the redundancy region.

This allows variations of the sequence of operations of reading redundancy data.

These and other objects, features, aspects and advantages of the present invention will become more apparent from the following detailed description of the present invention when taken in conjunction with the accompanying drawings.

DESCRIPTION OF THE PREFERRED EMBODIMENTS

The present invention will now be specifically described referring to the diagrams illustrating the preferred embodiments.

<Configuration of the Semiconductor Storage Device>

Figure 1:
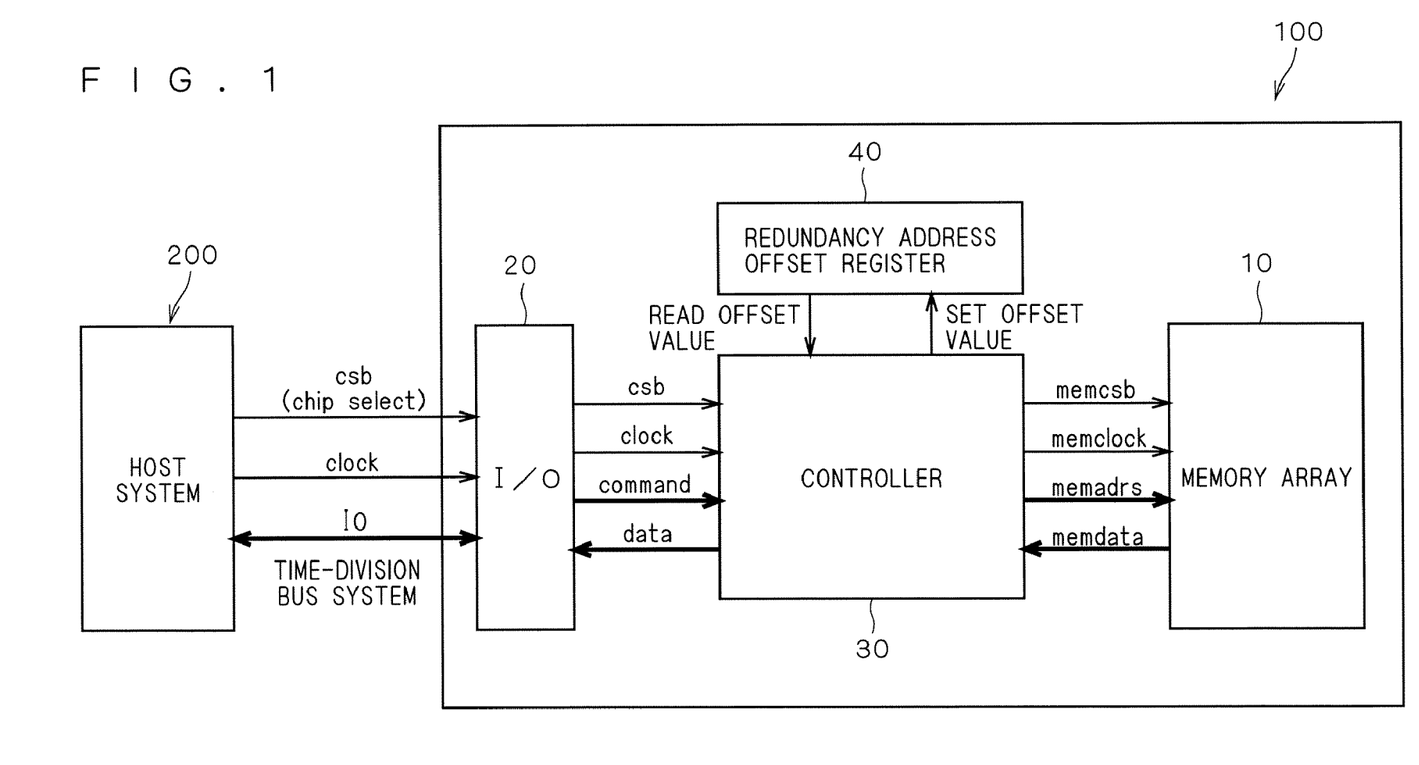
FIG. 1 is a block diagram illustrating the configuration of the semiconductor storage device according to the present invention.

FIG. 1 is a block diagram showing the configuration of a semiconductor storage device and external equipment (hereinafter referred to as a host system) according to the invention.

As shown in FIG. 1, the semiconductor storage device 100 includes a memory array (a nonvolatile memory such as Flash EEPROM, for example) 10, an I/O portion 20, a controller 30, and a redundancy address offset register 40. A host system 200 is provided externally to the semiconductor storage device 100, and the host system 200 and the semiconductor storage device 100 send and receive data, commands, etc. to and from each other.

The I/O portion 20 sends out data and the like stored in the memory array 10 to the host system 200. The I/O portion 20 receives commands sent from the host system 200. The data and commands are transmitted in a time-division manner through a bus between the semiconductor storage device 100 and the host system 200.

The host system 200 sends a chip select signal (csb) and a clock signal (clock) to the controller 30 through the I/O portion 20. The controller 30 sends to the memory array 10 a chip select signal (memcsb) for the memory array 10 and a clock signal (memclock) for the memory array 10.

<Configuration of the Memory Array>

The controller 30 controls individual circuits in the semiconductor storage device 100. The redundancy address offset register 40 is used to set an offset value. In the redundancy address offset register 40, a given offset value is set, e.g., through an operation of the host system 200, as a starting address of a redundancy region 2 described later (see FIG. 2).

Figure 2:
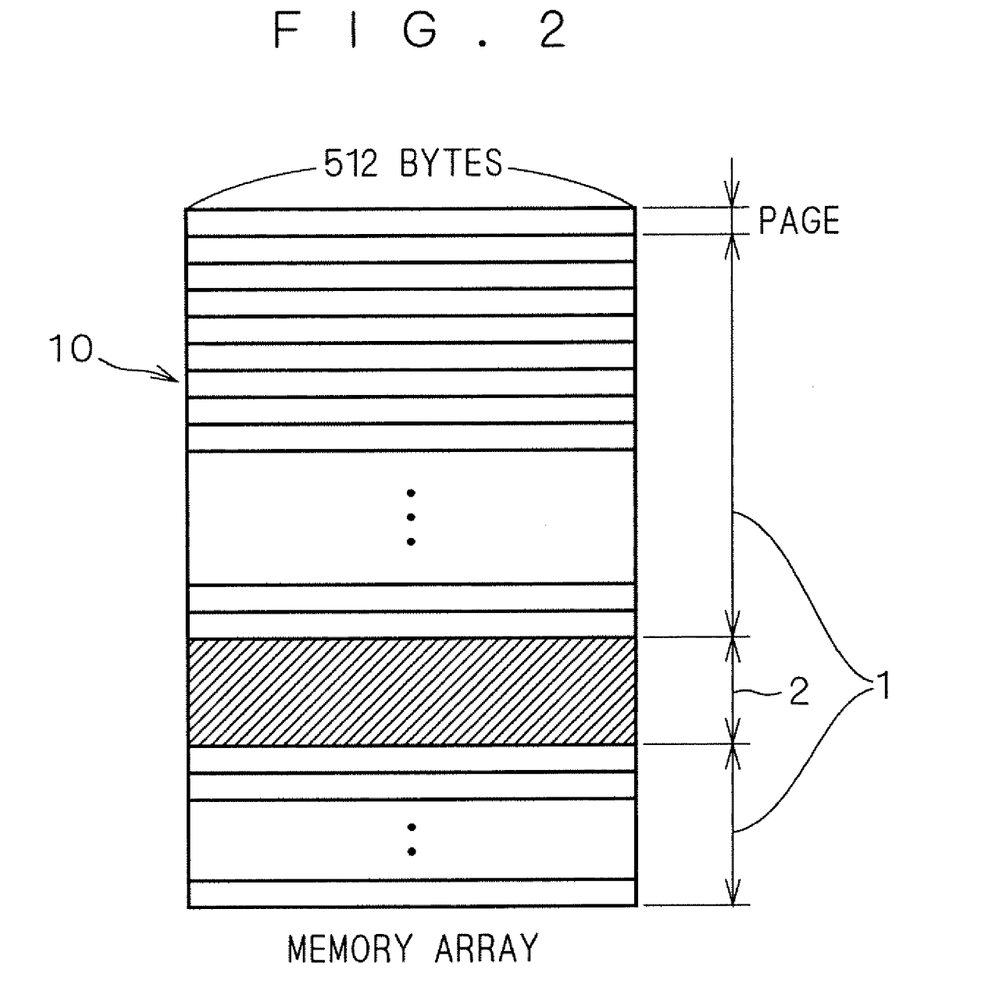
FIG. 2 is a diagram illustrating the configuration of the memory array of the invention.

FIG. 2 is a diagram schematically showing the structure of the memory array 10.

As shown in FIG. 2, the memory array 10 of the invention, containing faulty bits, includes a user region (the area with no pattern) 1 and a redundancy region (the hatched area) 2. The user region 1 is a region where user data is stored, and the redundancy region 2 is a region where information about the user region is stored, such as error-correcting code, fault map, etc. (the information can be regarded as redundancy data, and it is hereinafter referred to as redundancy data).

The user region 1 and the redundancy region 2 are both composed of, and managed as, given page units. That is, the memory array is configured such that (user region 1, redundancy region 2)=(given page unit)×n (an integer). As can be seen from FIG. 2, the given page units forming the user region 1 and the redundancy region 2 have the same data capacities (for example, a given page unit (one page) of FIG. 2 is formed of 512 bytes, but the number of bytes can be arbitrarily changed and "512 bytes" is shown by way of example and not of limitation).

<Operation of the Semiconductor Storage Device (Specifically, an Operation of Reading Data from the Memory Array)>

Next, the operation of the semiconductor storage device 100 of the invention will be described referring to FIGS. 1, 2 and 3 (more specifically, an operation of reading specified user data and redundancy data that corresponds to the specified user data from the memory array 10 will be described).

Figure 3:
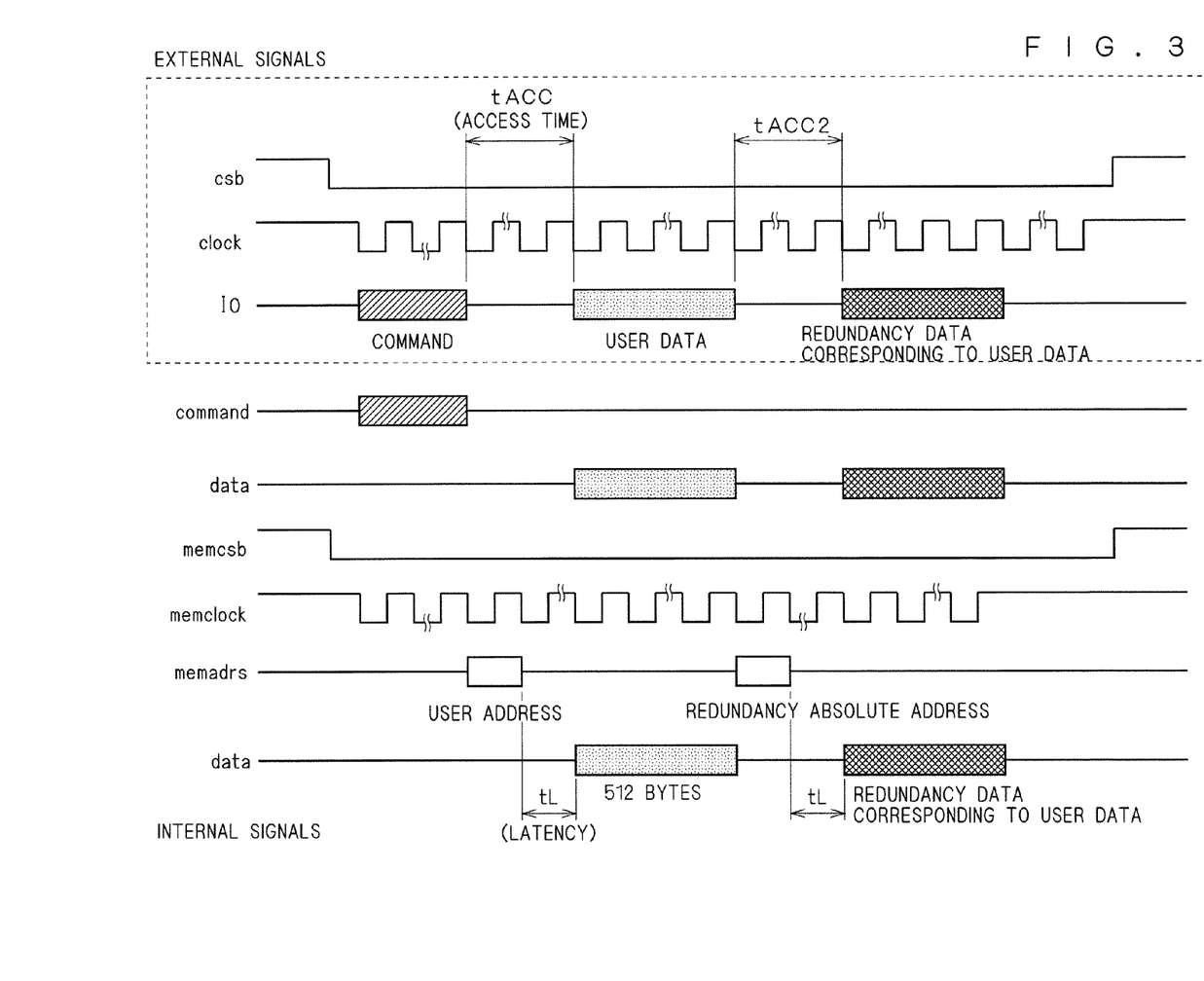
FIG. 3 is a timing chart illustrating an operation of reading specified user data and corresponding redundancy data.

FIG. 3 is a timing chart illustrating an operation of reading specified user data and redundancy data that corresponds to the specified user data from the memory array 10. The timing chart of FIG. 3 is shown by way of illustration and not of limitation, and another example of a timing chart will be shown later. The description below illustrates an example of operation in which the redundancy data is read according to a relative addressing scheme.

The host system 200 sends an "enable" chip select signal (csb) and a given-cycle clock signal (clock) to the controller 30, and the controller 30 sends an "enable" chip select signal (memcsb) and a given clock signal (memclock) to the memory array 10.

Figure 4:
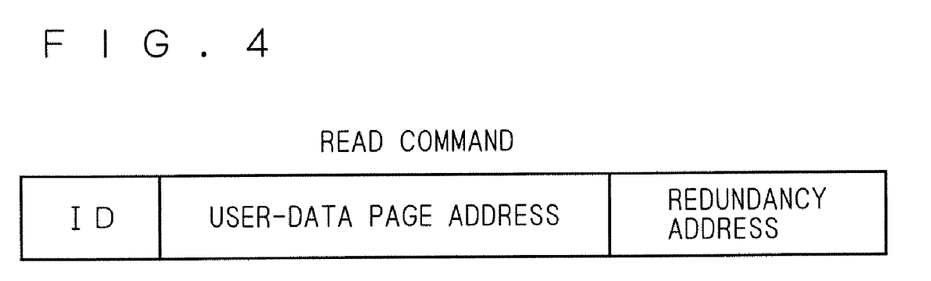
FIG. 4 is a diagram showing the structure of a read command.

In this condition, as shown in FIG. 3, the host system 200 sends a read command, structured as shown in FIG. 4, for example, to the semiconductor storage device 100 (more specifically, to the controller 30 through the I/O portion 20).

As shown in FIG. 4, the read command, for reading data, includes an ID, a user-data page address (which can be regarded as information about the user address), and a redundancy address (which can be regarded as information about the redundancy address).

Now, the ID includes ID information. The user-data page address includes information about the page address in the user region 1 where the specified user data is stored. The redundancy address includes information about the redundancy address in the redundancy region 2 where the redundancy data corresponding to the specified user data is stored.

It is assumed here that the redundancy address is a relative address. However, needless to say, the redundancy address may be an absolute address. That is, the scheme of addressing may be relative addressing (Scheme A) as described herein, or may be absolute addressing (Scheme B).

The addressing may adopt an addressing scheme (Scheme C) in which the current address is specified on the basis of the amount of variation from the previous address (which can be regarded as information about the redundancy address), or an addressing scheme (Scheme D) in which the controller 30 specifies the address on the basis of a given expression for calculation (which can be regarded as information about the redundancy address). The expression for calculation can be set from the host system 200.

In the Schemes A and C, the command argument (i.e., the information about the redundancy address shown in FIG. 4) may be an address value or an index value. In the Scheme D, the command argument is an index value.

Now, the controller 30 receives the read command structured as shown in FIG. 4, and reads one page (e.g., 512 bytes) of user data (see memdata of FIG. 3) from the user region 1 of the memory array 10, on the basis of the page address of the read command (which can be regarded as the user address of memadrs of FIG. 3).

During this process, the user data is read out after a given latency time has passed after the controller 30 outputted the user address to the memory array 10. The user data is thus read from the memory array 10 and then sent directly to the host system 200 (see FIG. 3).

The controller 30 also obtains the absolute address where the specified redundancy data is stored (which can be regarded as the redundancy absolute address shown in FIG. 3) on the basis of the offset value previously set in the redundancy address offset register 40 and the redundancy address (relative address) in the read command.

In the redundancy address offset register 40, a given offset value is set as the starting address of the redundancy region 2 as described later, e.g., through an operation of the host system 200. More specifically, the controller 30 receives a given command sent from the host system 200 and sets the offset value on the basis of the command.

The redundancy absolute address is thus derived, and the user data has been read out, and then the controller 30 reads the redundancy data (see memdata of FIG. 3) that corresponds to the user data, from the redundancy region 2 of the memory array 10 on the basis of the redundancy absolute address (see the redundancy absolute address of memadrs of FIG. 3).

The specified redundancy data is read out after a given latency time has passed after the controller 30 outputted the redundancy absolute address to the memory array 10. The redundancy data is thus read and then sent directly to the host system 200 (see FIG. 3).

The memory array 10 of the present invention is composed of, and managed as, the user region 1 formed of given page units and the redundancy region 2 formed of the same given page units. That is, an area formed of given page units in the memory array 10 can be used either as the user region 1 or as the redundancy region 2. This offers the effects below.

That is, the circuitry for reading redundancy data from the redundancy region 2 can be used also as circuitry for reading user data from the user region 1. Accordingly, it is not necessary to provide a specialized circuit for reading redundancy data from the redundancy region 2, and so the manufacturing costs are not increased and the process of testing the semiconductor storage device is not complicated (first effect).

Also, it is possible to flexibly change the arrangement of the redundancy region 2 in the memory array 10 according to the tendency of faults in the memory array 10 (i.e., according to variations among individual memory arrays 10) (second effect).

For example, when the memory array 10 is used as OTP (One-Time Programmable), an error-free area can be set as the redundancy region 2. This eliminates the need for error correction of the redundancy region 2, allowing the system to operate at higher speed.

Also, the error-correcting scheme can be selected freely, e.g., according to the tendency of errors in each memory array 10, which allows optimization of the redundancy region 2.

Also, in the memory array configured as shown in Patent Document 1, when the memory array 10 is a perfect memory, for example, it is impossible to remove the redundancy regions, which results in a waste of area. However, in the memory array 10 configured according to the present invention, the entire memory array area can be set as the user region 1.

Also, with the memory array configuration of Patent Document 1, the host system may issue a user-data read command and a redundancy-data read command in order to read specified user data and the corresponding redundancy data.

On the other hand, in the configuration of the memory array 10 of the invention, specified user data and the corresponding redundancy data can be read by the issue of a single read command as shown in FIG. 4. Accordingly, the semiconductor storage device 100 of the invention is capable of performing the reading operation at higher speed, as compared with the operation of reading user data and redundancy data with two commands as mentioned in the preceding paragraph.

Also, when the redundancy address in the read command is an address value or an index value used in relative addressing and the semiconductor storage device 100 includes the redundancy address offset register 40 capable of setting an offset value, it is then possible to read the specified redundancy data according to a relative addressing scheme under control by the controller 30.

The redundancy address offset register 40 is capable of setting the offset value through an operation of the external equipment (the host system 200). The starting address of the redundancy region can thus be freely changed through an operation of the external equipment. That is, the position of the redundancy region in the memory array can be freely changed through an external operation.

Figure 5:
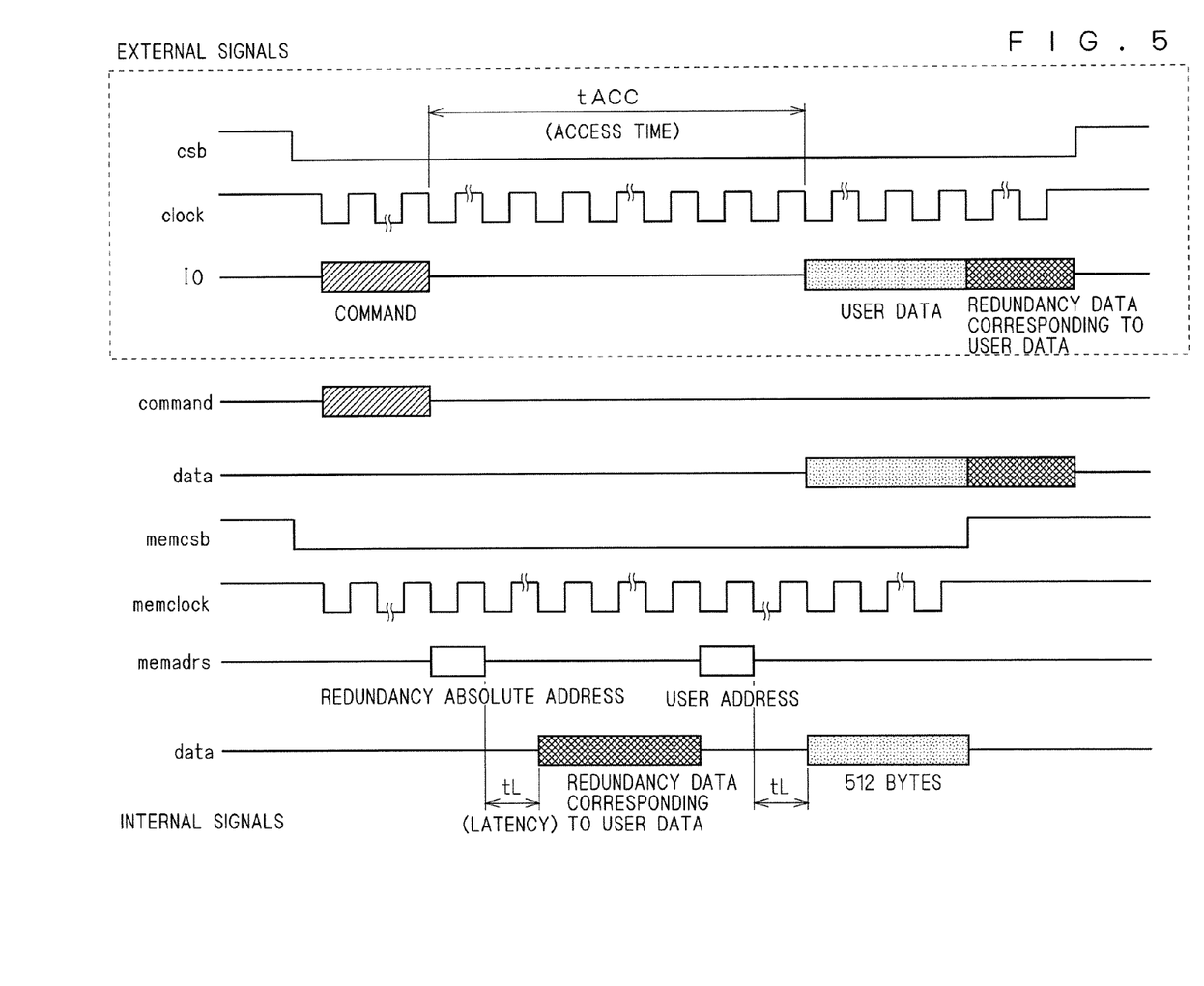
FIG. 5 is a timing chart illustrating another example of the operation of reading specified user data and corresponding redundancy data.

The data reading timing chart of FIG. 3 is shown by way of example, and specified user data and the corresponding redundancy data may be read according to the timing chart shown in FIG. 5, for example.

In the read operation shown in FIG. 5, the redundancy data corresponding to the specified user data is read from the memory array 10 first. Then, that redundancy data is temporarily stored in a redundancy data storing register 50 as provided in the semiconductor storage device 100 shown in FIG. 6, for example. Subsequently, the specified user data is read from the memory array 10. The redundancy data stored in the redundancy data storing register 50 is then outputted to the host system 200 following the user data (FIG. 5).

In the example above, the redundancy data that corresponds to the specified user data is read on the basis of the redundancy address in the read command shown in FIG. 4.

Figure 6:
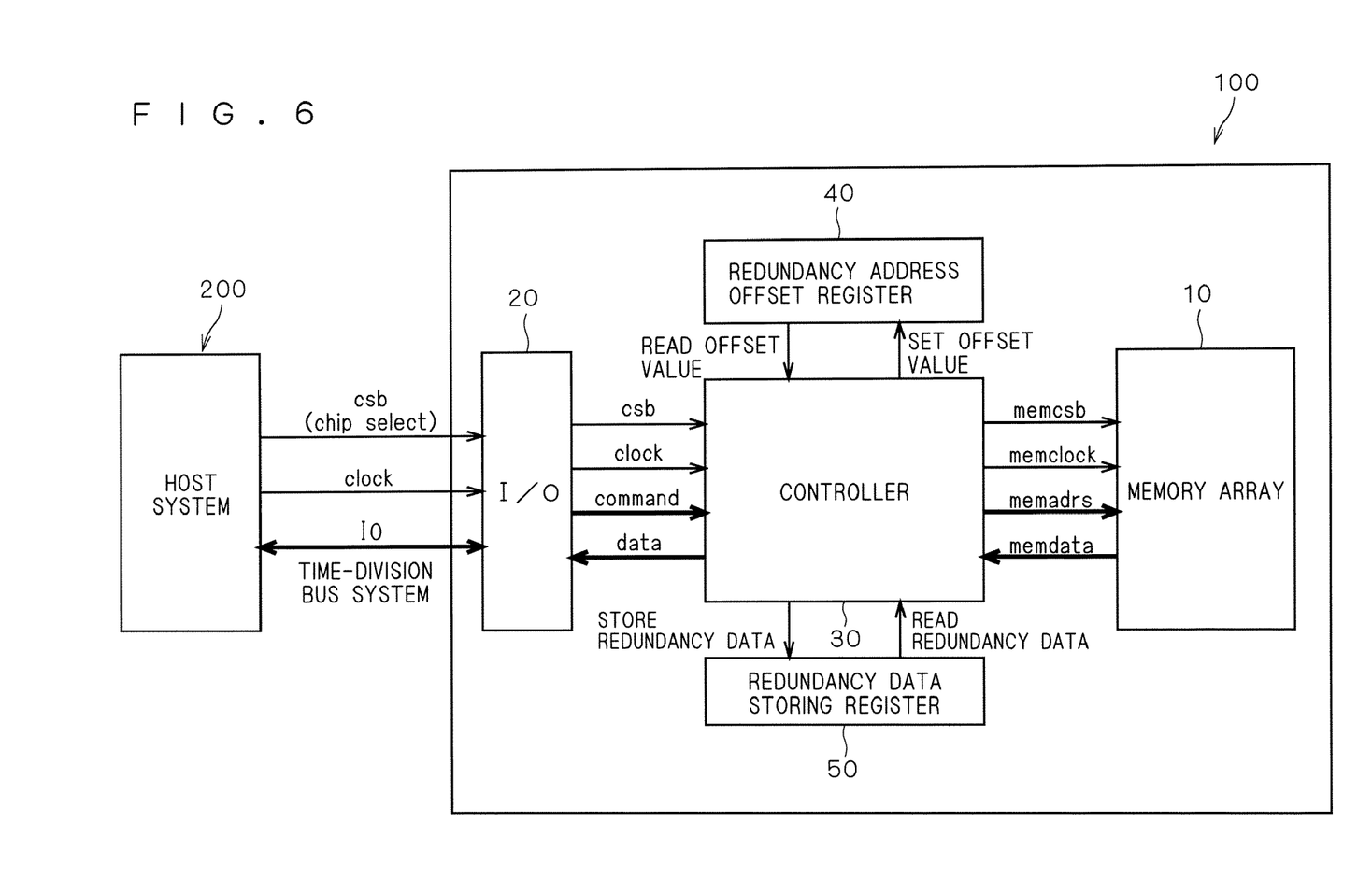
FIG. 6 is a block diagram showing another example of the configuration of the semiconductor storage device of the present invention.

However, one page of data that includes the redundancy data corresponding to the specified user data may be read from the memory array 10 on the basis of the redundancy address of the command, in which case only the redundancy data that corresponds to the specified user data may then be stored in, e.g., the redundancy data storing register 50 shown in FIG. 6, and the data stored in the redundancy data storing register 50 is adopted.

As can be seen from the examples of read operation, additionally providing the redundancy data storing register 50 as shown in FIG. 6 allows variations of the sequence of operations of reading the redundancy data (for example, FIGS. 3 and 5).

While the invention has been described in detail, the foregoing description is in all aspects illustrative and not restrictive. It is understood that numerous other modifications and variations can be devised without departing from the scope of the invention.

What is claimed is:

1. A semiconductor storage device comprising a memory array, said memory array comprising:
   a user region where user data is stored; and
   a redundancy region where redundancy data is stored,
   wherein said user region and said redundancy region are each formed of at least one entire given page unit and each page unit in said memory array can be used either as said user region or as said redundancy region.

2. The semiconductor storage device according to claim 1, further comprising:
   an I/O portion that receives, from outside, a read command that contains information about a user address indicating an address in said user region where a specified piece of said user data is stored, and information about a redundancy address indicating an address in said redundancy region where a piece of said redundancy data that corresponds to said specified piece of user data is stored; and
   a controller that reads said specified piece of user data from said user region on the basis of said information about said user address, and that reads said piece of redundancy data that corresponds to said specified piece of user data from said redundancy region on the basis of said information about said redundancy address.

3. The semiconductor storage device according to claim 2, wherein said information about said redundancy address is an address value or an index value used in relative addressing, said semiconductor storage device further comprises a redundancy address offset register that is capable of setting an offset value, and
   said controller reads said specified piece of redundancy data from said redundancy region on the basis of said address value or said index value and said offset value set in said redundancy address offset register.

4. The semiconductor storage device according to claim 3, wherein said redundancy address offset register is capable of setting said offset value through an operation of external equipment.

5. The semiconductor storage device according to claim 2, wherein
   said information about said redundancy address indicates a variation from a previous address, and
   said controller specifies a current address on the basis of the variation from said previous address and reads said piece of redundancy data that corresponds to said specified piece of user data from said redundancy region on the basis of the specified current address.

6. The semiconductor storage device according to claim 2, wherein
   said information about said redundancy address indicates a given expression for calculation, and
   said controller specifies the address on the basis of said given expression for calculation and reads said piece of redundancy data that corresponds to said specified piece of user data from said redundancy region on the basis of the specified address.

7. The semiconductor storage device according to claim 1, further comprising a redundancy data storing register capable of temporarily storing said redundancy data read from said redundancy region.

* * * * *